Nov. 3, 1964 J. N. ROSSEN ET AL 3,155,749
EXTRUSION PROCESS FOR MAKING PROPELLANT GRAINS
Filed May 3, 1960 4 Sheets-Sheet 3

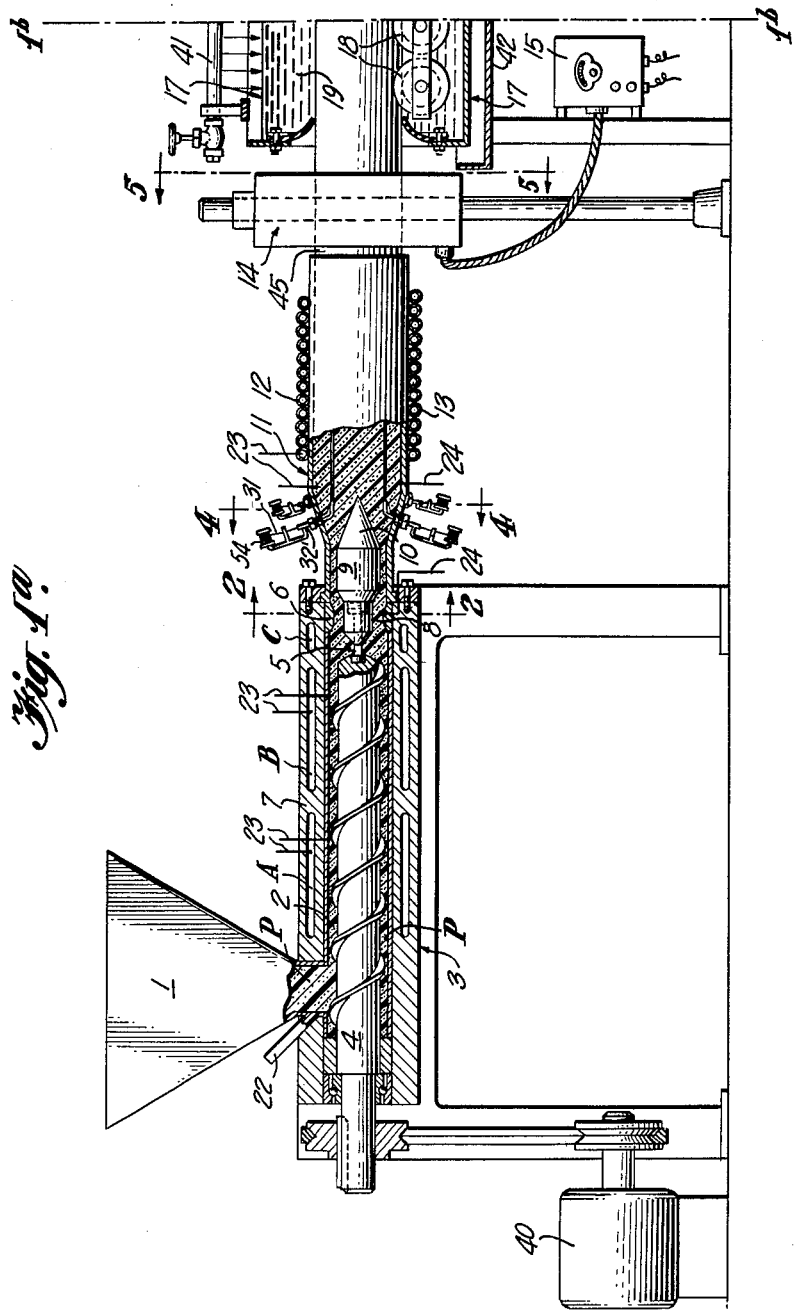

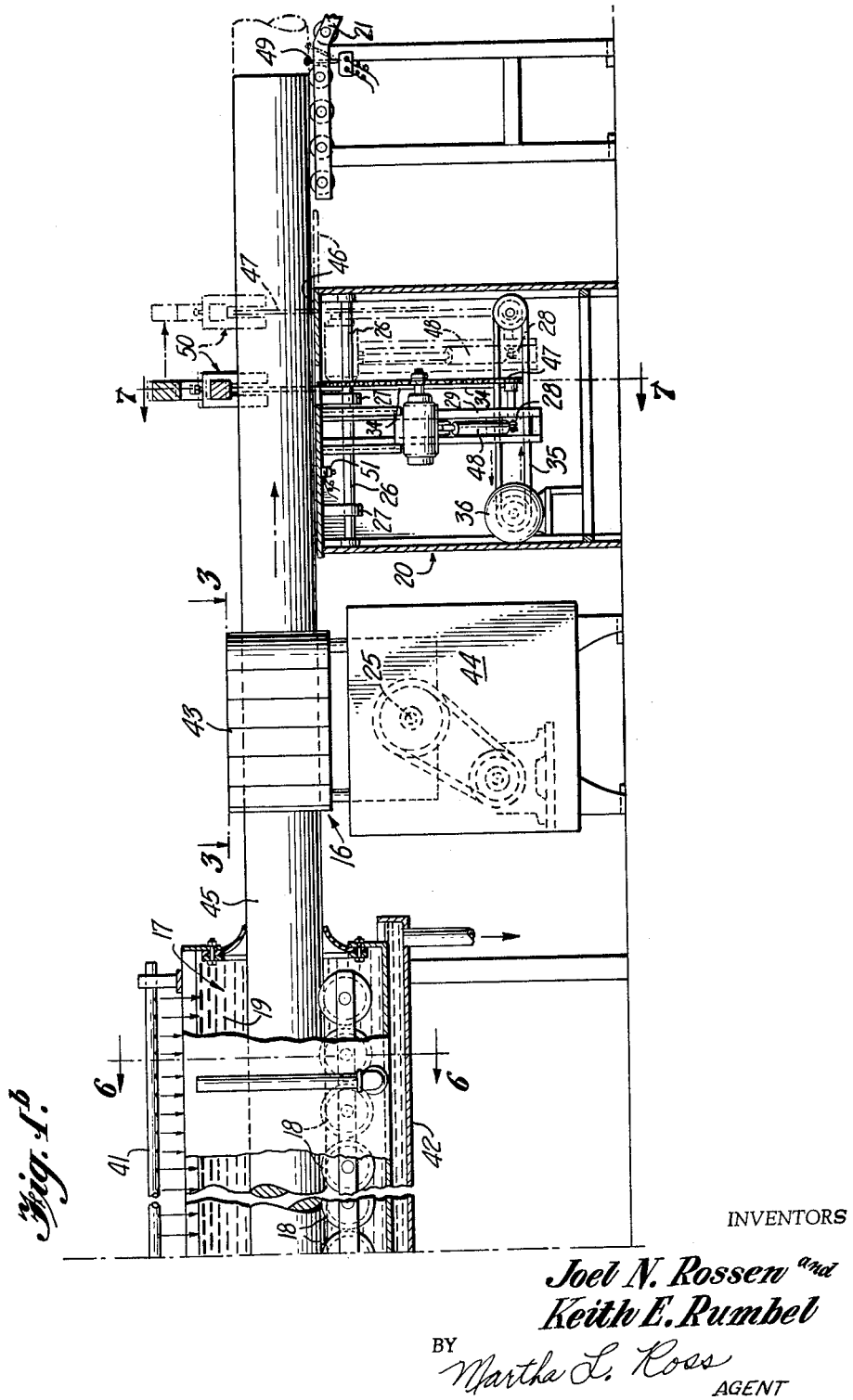

INVENTORS
Joel N. Rossen and
Keith E. Rumbel

BY Martha L. Ross
AGENT

Nov. 3, 1964     J. N. ROSSEN ET AL     3,155,749
EXTRUSION PROCESS FOR MAKING PROPELLANT GRAINS
Filed May 3, 1960                                       4 Sheets—Sheet 4

INVENTORS
Joel N. Rossen and
BY Keith E. Rumbel

Martha L. Ross
AGENT 3,155,749
EXTRUSION PROCESS FOR MAKING
PROPELLANT GRAINS
Joel N. Rossen and Keith E. Rumbel, Falls Church, Va.,
assignors to Atlantic Research Corporation, a corporation of Virginia
Filed May 3, 1960, Ser. No. 26,649
25 Claims. (Cl. 264—3)

This invention relates to a new process for the continuous curing and casting of solid propellent grains. More specifically, it relates to a process for the curing and shaping of composite propellant grains made by the fluid plastisol technique.

A very effective, convenient, and reproducible plastisol method for making solid propellent grains, consisting essentially of finely divided solid oxidizer dispersed in a plasticized thermoplastic polymer fuel matrix, has recently been developed. The technique comprises the preparation of uniformly dispersed fluid mixes of finely divided, solid, thermoplastic polymer and oxidizer in a high-boiling liquid plasticizer which dissolves the polymer at a substantial rate only at elevated temperatures. The mix, though viscous in character because of the high solids loading, is sufficiently fluid to flow and to assume the shape of a container into which it is introduced without requiring the application of pressure. To obtain the requisite stability, homogeneity and fluidity, the polymer particles must be small, generally up to about 50 microns and preferably no larger than about 100 microns in diameter, to avoid instability and separation; substantially non-porous to minimize absorption of the plasticizer into the particles; and spherical to prevent matting which would destroy fluidity.

The fluid slurry is cured into a solid propellent grain by heating it to the temperature at which the finely divided polymer dissolves in the plasticizer and, thereby, forms a rigid gel. The molding and curing procedure hitherto generally employed comprises pouring the plastisol into a mold of the desired shape and size and curing the propellent mix by applying heat externally to the mold. This, perforce, is a batch operation and requires a substantial period of time, which varies with the diameter of the grain from about one hour for a grain of one to two inch diameter to as much as a day or more for large grains. The heating must be carefully regulated to ensure complete cure throughout without degradative overcure of the exterior portions of the grain. It is also necessary to avoid excessively high cure temperatures or even maintenance of the proper elevated cure temperature for excessively long periods of time since this may result either in autoignition of the grain or degradative chemical decomposition or reaction of the polymer-oxidizer composition. These factors effectively limit the size of grains that can be made by the casting technique. After the heat cure is completed, additional time is required in the mold for cooling of the grain. Such a batch curing and molding process is thus relatively costly in terms of time, equipment, space, and man-hours.

The object of this invention is to provide an extrusion process for molding and curing fluid plastisol, composite propellent mixes, which is continuous, which greatly reduces the amount of time, equipment, space and labor required, and which makes possible an enormous increase in unit production.

Another object is to provide a process for uniformly heat curing a plastisol propellant of substantially any desired diameter completely throughout its mass, without overheating or chemical degradation of the propellent material.

Still another object is to provide a process for making cured plastisol propellent grains of reproducible, varied length and diameter without requiring the use of molds.

Other objects and advantages will become evident from the following detailed description and the drawings.

In the drawings, in which like numerals connote like parts:

FIGURES 1a and 1b comprise a longitudinal, vertical section showing diagrammatically apparatus for carrying out the process of the invention in continuous fashion;

FIGURE 2 is a vertical transverse sectional view on an enlarged scale taken along line 2—2 of FIGURE 1a;

FIGURE 3 is a fragmentary plan view of the extrudate take-off mechanism as viewed along the line 3—3 of FIGURE 1b;

FIGURE 4 is an enlarged transverse sectional view through the extrudate die and associated wire feeding tubes taken along the line 4—4 of FIGURE 1a;

Figures 2, 3, 4:
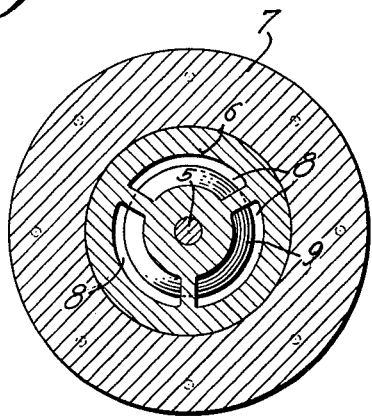
Figure 5:
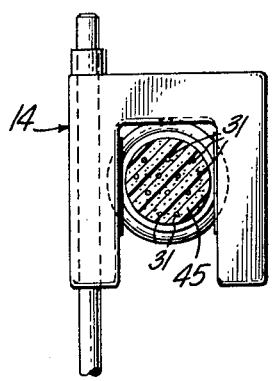
FIGURE 5 is a transverse vertical sectional view taken along the line 5—5 of FIGURE 1a which shows the extrudate gauging mechanism.
Figure 6:
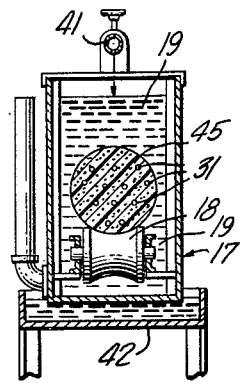
FIGURE 6 is a vertical transverse sectional view thru the extrudate cooling means taken along line 6—6 of FIGURE 1b.
Figure 7:
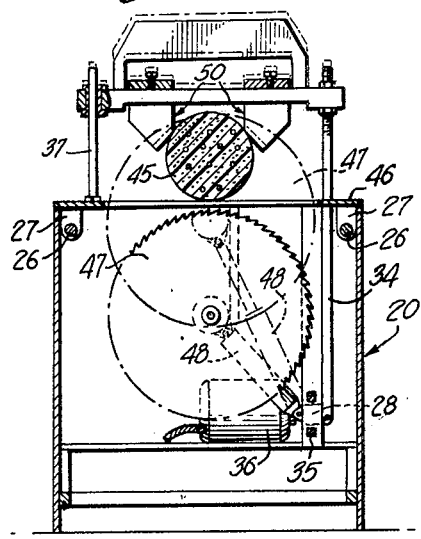
FIGURE 7 is a vertical transverse sectional view of the cut-off means as viewed along the line 7—7 of FIGURE 1b.

Broadly speaking, the process comprises pouring a mixture of the propellent components in the form of a fluid plastisol into a heat-jacketed screw worm extruder, provided at its forward end with a means for producing substantial back pressure, heating the plastisol as it is forced through the extruder barrel to solution temperature of the suspended, finely-divided solid polymer in the liquid plasticizer by the frictional heat generated by the viscous shear stresses induced by the turning screw, supplemented by the heating jacket, passing the resulting hot, thermoplastic gel containing the dispersed finely-divided solid oxidizer into a shaping device or die of the desired diameter, cooling the shaped column of propellant so that it sets into a rigid gel, and then cutting the advancing, cooled, shaped column into desired grain lengths.

The process is particularly adapted to the curing and molding of composite, polyvinyl chloride, plastisol propellants, namely propellants in which the polymeric fuel binder is polyvinyl chloride or a copolymer of vinyl chloride and vinyl acetate, in which the vinyl chloride is in major proportion. Polyvinyl chloride and its copolymers with polyvinyl acetate are commercially available in fluid plastisol grade, namely in the form of small, non-porous, spherical particles dispersible in a high-boiling organic liquid plasticizer, which dissolves the polyvinyl chloride readily only at elevated temperatures to produce stable, homogeneously dispersed, fluid slurries. Such organic plasticizers are known to the art and include, for example, the butyl, octyl, glycol, and methoxy-methyl esters of phthalic, adipic, and sebacic acids; high molecular weight fatty acid esters; and the like.

Since the plasticizers are organic compounds containing C and H, they function as fuel components in the propellants. The amount of plasticizer is critical only insofar as it influences the desired physical properties of the fluid mix and the cured propellant grain. The plasticizer must be present in amount sufficient to suspend the dispersed solids, including the polymer, solid oxidizer, and other solid components, such as powdered metal fuels, without loss of fluidity, and not so much as to make the cured grain excessively soft. These criteria are generally met with ratios by weight of polymer to plasticizer of about 3:2 to 2:3.

Other organic polymers which can be made in fluid plastisol grade can also be employed for the production of composite propellent grains by the process of our invention. These include, for example, lower alkyl cellulose esters, such as cellulose acetate, as disclosed in Sloan et al. U.S. 2,809,191, and nitrocellulose, as disclosed in Sloan et al. U.S. 2,931,800 and U.S. 2,931,801. Nitrocellulose can be used as the fuel binder component in composite propellent grains having excellent ballistic properties and considerably reduced sensitivity, as compared with conventional double base propellants, when at least a portion of the liquid organic plasticizer is of the inert type, namely does not contain oxygen available for combustion, and a finely-divided, solid, inorganic oxidizer is included for combustion of such plasticizer. A self-oxidant, organic, liquid plasticizer, namely a compound containing combined oxygen available for combustion of other components of the molecule, such as nitroglycerine, can form part of the liquid plasticizer system.

The finely-divided, solid oxidizer can be any inorganic compound which contains combined oxygen which with it parts readily for combustion of the fuel components of the propellant. Such inorganic oxidizers are insoluble in the plasticizer solvent so that they remain dispersed in the plasticized polymer matrix of the propellant grain. Suitable oxidizers include, for example, inorganic oxidizing salts, such as $NH_4$, K, Na, and Li perchlorates and nitrates, and metal peroxides, such as $Na_2O_2$, $BaO_2$, and $CaO_2$. The amount of oxidizer incorporated must be sufficient to maintain active combustion of the fuel components of the propellant. This can be as low as 35% by weight of the composition, but is generally a major proportion, and is often as high as 80 to 90%.

Finely divided, solid metal powders, such as Al, Mg, B, Ti, and Si can be introduced into the propellent compositions as an additional fuel component. Such metal powders possess the advantages both of increasing density and improving specific impulse because of their high heats of combustion. The amount of such metal fuel is not critical, but is determined largely by the specific use and the amount, which, in combination with the finely-divided, solid oxidizer, can be suspended in the plastisol mix without impairing fluidity to the point where the plastisol will not flow under its own weight. In general, the metal fuel constitutes a minor proportion by weight of the propellent composition.

Other additives which can be incorporated into the propellent compositions include, for example, burning rate catalysts, such as copper chromite and ammonium dichromate; coolants for reducing the temperature of the gases generated by combustion of the propellant where necessary, as in the case of some turbine applications, such as monobasic ammonium phosphate; opacifiers, such as carbon black; and the like.

The fluid propellent mix can be prepared shortly before the extrusion curing and molding. However, one of the important and convenient advantages of the plastisol technique stems from the fact that, when properly prepared, the plastisol remains stable and fluid for periods as long as several days, weeks or even months, so that the slurries can be prepared considerably in advance.

Curing of the fluid mix, namely solution of the thermoplastic polymer in the liquid plasticizer, is obtained by the heat generated throughout the mass of the mix by the shearing stresses produced as the screw worm rotates and advances the propellent composition through the extruder barrel. Although this, theoretically, can produce all of the heat requisite for cure, practically, it is desirable that the frictional heat produced by the screw worm be supplemented by a peripheral source of heat provided, for example, by a heating jacket. The amount of frictional heat generated by the shearing stresses induced by the rotating screw is determined by such factors as its speed of rotation; the viscosity and other rheological properties of the mix, such as its thixotropy, both as it enters the extruder and as it changes in these properties because of the solution cure as it is heated during its advance in the extruder; and the length of residence time of the mix in the extruder, which in turn is determined by such factors as back pressure, extruder barrel length, and rotational speed.

The viscosity and other rheological properties are essentially fixed for a specific plastisol propellent mix but may vary for different formulations. Variation in residence time by variation in the length of a given extruder to meet such contingencies is clearly impractical. Some modification of back pressure can be obtained by varying the cross-sectional area of the venting orifice through which the cured propellant passes as it leaves the extruder. This can be done by physical substitution of restricting means providing different cross-sectional venting areas. This is an expedient which is available as an additional control mechanism prior to start-up of a given extrusion run. It cannot readily be varied during the extrusion operations.

A convenient method for increasing the amount of frictional heat generated to the point where it is adequate to raise the temperature to cure level, and to offset heat losses at the wall of the extruder barrel by conduction and radiation in the absence of a heating jacket, would appear to lie in an increase in rotational speed of the screw worm. This expedient, however, is limited by the nature of the plastisol-oxidizer mix when it is fed gravitatonally into the extruder. The plastisol, through sufficiently fluid to flow under its own weight, is generally viscous because of its high solid oxidizer, or oxidizer plus other solid fuel, such as powdered metal, content. This slows feed rate into the extruder. Rotational speeds adequate to provide all of the requisite heat may, in some cases, advance the plastisol mix faster then the feeding rate, so that the screw becomes starved, with resultant excessive working of the material within the barrel and likelihood of explosion. Within such limitations variations in screw speed provides an excellent means for adjusting temperature by a predetermined setting prior to extrusion and by variation during extrusion.

Supplementation of the frictional heat generated by externally applied heat is advantageous since it compensates for heat loss at the wall, eliminates any hazardous need for excessive rotational screw speed, can readily be varied in amount of heat input by variation in the temperature or speed of flow of the heating fluid and can, therefore, aid in the adjustment of temperature conditions within the body of the propellent material required by different mixes and makes possible such adjustments in rotational screw speed as may be made desirable by processing conditions.

Instead of gravity loading, the plastisol mix can be pressure-fed into the extruder at a rate which will keep the extruder adequately filled at substantially any desired screw speed. All of the heat required for the solution cure can then be obtained by frictional shear stress and external heating completely dispensed with. Even under such conditions, however, it may be desirable to have available an externally applied source of heat to compensate for heat loss at the wall and to provide for greater processing flexibility.

It is generally advisable to being the extrusion operation with a "cold" plastisol mix, namely an inert, non-propellent composition which closely approximates the "hot" propellent composition except for substitution of an inert salt, such as KCl, for the inorganic oxidizer. This primes the equipment, prevents hazardous feed starvation of the screw at the onset of operation, and permits personnel locally to control the process until steady state conditions are reached. The inert salt imparts different rheological properties to the plastisol mix from those produced by the solid oxidizer, so that some modification, such as change in external heating temperature or in screw rotational speed may be required upon introduction of the "hot" mix. Since optimum conditions for a given plastisol propellent mix can be predetermined by routine testing, the necessary adjustments in operating conditions can readily be made at the transition from "cold" to "hot" mix.

In carrying out the process, the "cold" or inert fluid mix P is poured into hopper 1, and flows under the force of gravity into cylindrical barrel 2 of the extruder assembly 3, where screw worm 4, rotated by conventional motor means 40, engages and shears the mix as it is advanced through the barrel. The screw worm must not be permitted any free play which would bring it into frictional contact with the extruder barrel wall, since this might cause ignition of the propellent mix. To prevent this, the forward end of the screw worm is rotatably mounted on stub shaft 5, which is, in turn, attached to spider crown 6.

The extruder barrel is surrounded by heating jacket 7, which can be compartmentalized, as, for example, into 3 heating zones A, B, and C, as shown, to provide for the circulation of heating fluid of the same or different temperature around different portions of the barrel contents. Any suitable heating fluid can be used, such as hot oil, superheated steam, and the like.

The plastisol mix is uniformly heated throughout its mass by the frictional heat generated by the rotating screw and heat picked up by contact of the material with the heated walls of the extruder barrel. The temperature of the heating jacket can be regulated to any desired level relative to the amount of heat generated by the rotating screw to obtain a fine adjustment of temperature within the plastisol material. When the cure temperature is reached within the fluid plastisol mix, solution of the thermoplastic polymer in the plasticizer is very rapid and the material forms a gel, which is soft at the elevated temperature conditions within the extruder. In the case of the polyvinyl chloride plastisols, the cure temperature is generally in the range of about 340° to 350° F.

Back pressure to ensure adequate working of the material by screw worm is produced by the restricted venting area provided by passages 8 in spider crown 6, and by axial plug 9, mounted on the forward end of crown 6. Different venting areas and, therefore, different back pressures, can readily be provided before extrusion by the substitution of plugs of different maximum cross-sectional area. The forward end 10 of the flow restricting plug 9 is preferably tapered to foster coalescence of the extruding material as it exits from the extruder into die 11. Die 11 is a cylindrical tube, provided with a heating jacket 12 to keep the gelled mix in soft, thermoplastic condition and, thereby, to ensure coalescense.

The propellent grains can be varied in diameter within relatively wide limits by varying the diameter of the die. Diameter control by the die is somewhat proximate because the grain tends to expand as it leaves the die, in an amount which is a function of the rotational screw speed, and then to shrink upon cooling. Control within very fine tolerances can be achieved, in combination with preset die diameter, by varying the rate of grain take-off. To minimize friction which might cause undesirable laminar flow of the soft, gelled extrudate, the inner surface 13 of the die is preferably composed of a hard, highly polished material, such as chrome.

After leaving the die, the column of extrudate 45 is ready for cooling to its final rigid gel state. For fine diameter control, it is desirable to measure the diameter of the extruding column after leaving the die prior to cooling. This can be accomplished by means of a suitable, preferably non-contact, measuring device, shown diagrammatically at 14, such as a gauge head positioned over the extrudate between the extruder and the cooling trough, which operates by measuring the diameter of the extrudate with a phototube detector as it passes between two beams of light, and which transmits the signals generated to an electrical conversion unit 15, which, in turn automatically controls the speed of the take-off unit 16. Such photoelectric gauges and conversion units are commercially available, e.g. the Microlimit Diameter Control System manufactured and sold by Daystrom, Inc. This or equivalent control means correct deviations from the desired extrudate diameter by automatically varying take-off ratios to induce neck down or build up of the extrudate as it emerges from the extruder die before being cooled to a set dimension in the cooling unit. This permits dimension control to fine tolerances.

The column of hot extrudate is then passed into a cooling unit 17, shown diagrammatically, where it is supported in suitable manner as on concave rollers 18 and cooled to ambient temperature by immersion in a cooling fluid, such as water 19, whereupon it sets into a rigid gel. The water is introduced from above via water inlet tube 41 and is removed via overflow trough 42.

From the cooling trough, the cooled column of extrudate is introduced into the take-off unit 16, where two traction belts 43, driven by conventional motor means, not shown, in support housing 44, are positioned to grasp and pull it from the die and through the cooling trough at a rate determined by the diameter controlling system. The traction belts 43 may be withdrawn from or advanced toward the extrudate column by means of a threaded lead screw 25 connected by a belt and pulley drive with the motor shown in broken lines in FIGURE 16, the advanced and retracted positions of the belt being indicated by solid and broken lines, respectively, in FIGURE 3. The product is then fed by the take-off unit to saw unit 20, which cuts it into predetermined lengths.

The cut-off saw can be one of conventional type, such as the Emery Automatic Cut-Off Saw manufactured by The Vern Emery Co., which is operated automatically by a system of microswitches tripped in sequence. The saw unit 20, as shown diagrammatically, comprises a moveable table top 46, secured to shafts 26 by horizontally shiftable collars 26 to provide for support and forward travel of the saw with the moving column of cooled and set extrudate, and saw blade 47, which is raised for cutting, and lowered when not in use by pneumatic piston 48. Actuation of the piston for upward movement of the saw for cutting is initiated when the end of the extrudate trips a micro-switch on swing gate 49 mounted in the path of the extrudate column forward of the saw at a distance predetermined for the desired grain length. Actuation of the piston for the upward cutting stroke in turn actuates clamp 50 to grasp the column of advancing extrudate. Upward movement of the piston is accompanied by some downward reaction movement of the piston cylinder, which, in turn, pushes downward block 28, which is in vertically moveable engagement with frame 29 fixed to moveable table top 46. Vertical rod 34 is attached at its lower end to block 28 and at its upper end to the clamp assembly 50, so that downward motion of block 28 simultaneously pulls down rod 34 and brings the clamp into engagement with the extrudate. As block 28 moves downward, it comes into pressure engagement with the lower, forwardly moving flight of belt 35 driven by motor 36. The clamp is attached to the moveable table top by means of guide rod 37, on which it is vertically slidable. The clamp engaging the forwardly moving column of extrudate, aided by the pressure engagement of block 28 with the forwardly moving flight of belt 35, advances the table top and saw at the rate of extrudate motion during the cutting cycle, as shown in dot and dash position in FIGURE 1b. At completion of the upward cutting stroke, micro-switch 51 is tripped to actuate the piston to commence its downward stroke. The piston cylinder moves upward, thereby moving block 28, rod 34, and clamp 50 upward out of clamping engagement with the extrudate column. The upward motion of the block brings it into pressure engagement with the upper return flight of belt 35. This retracts the table top and saw assembly and places it in readiness for the next cutting cycle. The electrical connections between the automatic actuating mechanisms are conventional and not shown.

The cut product is then pushed forward by the succeeding extrudate to a suitable removing means, as, for example, inclined rollers 21 which convey it by gravity to a collecting station. Removal of the cut section from the line resets the swing gate 49 for the next cutting cycle.

The use of the inert mix to initiate the process permits the presence of personnel locally to make manual adjustments where necessary. When steady process conditions are reached, as indicated by a leveling of the process temperatures and pressures at the desired values, the inert material feed into the hopper is cut off and the switch is made to propellent feed.

The propellent plastisol can be fed directly into the top of hopper 1. However, it has been found that a cleaner and more rapid transition from "cold" to "hot" feed can be obtained by pumping the propellent mix into the hopper through side feed tube 22, from a tank, not shown, under controlled pressure, in such manner that the "hot" feed vents into the hopper below the top level of the inert feed in the hopper. By initially setting the propellent feed rate above the requirement of the extruder, propellent is forced into the hopper to block the entry of the inert material remaining in the hopper into the extruder. The propellent plastisol mix is allowed to push the inert mix to a predetermined level in the hopper and this level is then maintained by remote adjustment of the feed tank pressure. Initially propellent feed tube 22 can be filled with the inert mix to provide sufficient time for personnel to switch to the propellent feed and leave the extrusion building before the "hot" plastisol reaches the extruder. Such adjustments as are required as, for example, in temperature of the heating fluid in the heating jackets of the extruder and die to compensate for the different rheological properties of the propellent plastisol mix, can then be done remotely.

Temperature and pressure conditions within the system can be monitored by strategically positioned thermocouples 23 and pressure transducers 24. The entire process can be remotely operated, controlled, and viewed by known means not shown.

The propellent extrusion can then be carried on continuously for as long as required or until the batch of propellent plastisol mix provided for the run is exhausted. Runs of indefinite length can be made by alternate feeding from a number of propellent storage tanks. Finished propellent grain production as high as 60 to 75 linear feet per hour can be obtained by the aforedescribed process.

The extrusion run is terminated by cut off of the "hot" mix feed line with simultaneous reintroduction of the "cold" mix to prevent terminal starvation of the screw worm and consequent overworking of propellent which might result in explosion. Some wastage of propellent, of course, occurs at the initial and terminal transition points. This, however, is relatively small.

Figure 8:
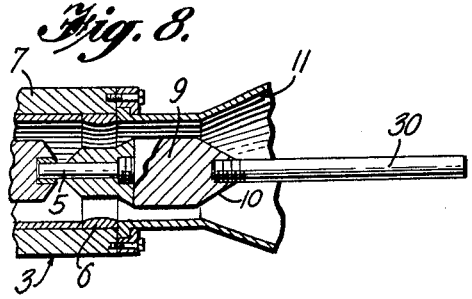
FIGURE 8 is a fragmentary longitudinal sectional view through the extrudate die showing a modification thereof.

In the apparatus is described above, the propellent grains produced are end-burning. It will be understood, however, that propellent grains of substantially any type, so long as the individual grain is of substantially constant cross-sectional dimension, can be made according to our process. Centrally perforated grains can be made, for example, simply by axially positioning within the die along its entire length, a mandrel of the desired cross-sectional shape and size extending from the forward face of the flow-restricting crown or plug at or adjacent to the exit point of the extrudate from the extruder. The cylindrical mandrel 30, shown in FIGURE 8, for example, results in a cylindrically perforated grain. The lateral surface of the grain can also be shaped as, for example, to form a grain of cruciform cross-section, by proper shaping of the walls of the die.

Metal wire heat conductors are longitudinally embedded in the matrix of some end-burning propellent grains to increase their burning rates. Such wires can be made of any heat conductive metal compatible with the propellent composition, such as silver, copper, aluminum, steel, tungsten, and the like. In some cases, the wires are coated with self-oxidant propellent compositions having a different burning rate from that of the propellent grain matrix or with an inert or non-self-oxidant coating of lower thermal conductivity than that of the propellent grain matrix as a means for controlling burning rate of the grain. Self-oxidant coatings having a higher linear burning rate than that of the propellent matrix on the metal wires result in higher grain burning rates than those induced by the bare metal wires alone. Inert insulator coatings and self-oxidant coatings of lesser burning rate than that of the grain matrix on the metal wires produce controlled grain burning rate between that of the grain matrix alone and that obtained with the bare wire.

Figure 9:
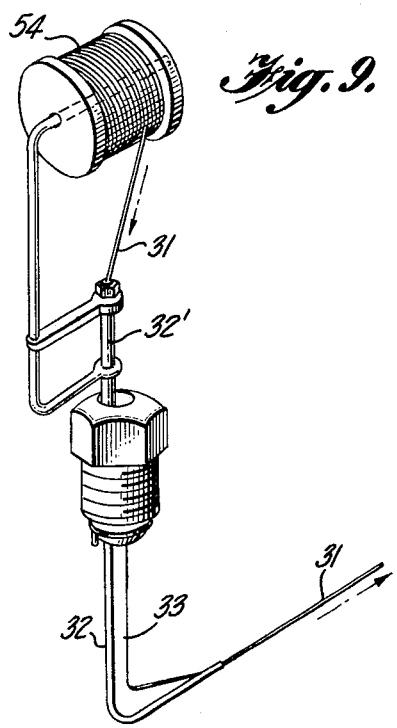
FIGURE 9 is a perspective view of one of the wire guide tubes.

A plurality of such metal wires, bare or coated, can be continuously introduced, in the desired number and pattern, while the hot, plastic extrudate is passing through the shaping die. As shown in FIGURES 1a, 4, and 9, this can be accomplished by introducing the wires 31 from spools 54 through guide tubes 32' and 32 extending through the wall of die 11 into the plastic, gelled propellant flowing there-through and angling the guide tubes 32 in the interior of the die in the downstream direction so as to align the wires parallel to the flow of the propellant. The proper pattern of wire placement can be obtained by varying the depth of insertion and the location of the wire guides as shown in FIGURE 4. Metal fins 33 can be attached to the downstream edge of the guides to provide structural strength to the tubes and to streamline the flow of material around them. Preferably, the wires are inserted into the die through the guide tubes before starting the extrusion. The soft extrudate, as it flows through the die entrains the wires and carries them along in proper alignment.

The following describes a specific illustrative embodiment of our process. The apparatus employed was substantially as shown in FIGURE 1.

The extrusion was started with an inert plastisol slurry having the following composition:

| | Weight, Percent |
|---|---|
| KCl [1] | 58.90 |
| Polyvinyl chloride | 8.62 |
| Dioctyl adipate | 10.79 |
| Powdered aluminum (5 micron) | 21.10 |
| Stabilizer [2] | 0.34 |
| British Detergent [3] | 0.25 |

[1] Bimodal particle size distribution: 2 parts, 45 microns; 1 part, 230 microns.
[2] A mixture of a polyfunctional epoxy compound and an organic Ba compound in 1:1 ratio.
[3] Wetting agent: equal parts of glyceryl monooleate, pentaerythritol dioleate, and dioctyl sodium sulfosuccinate.

The solids were stably and uniformly dispersed in the liquid dioctyl adipate plasticizer and formed a slurry having a viscosity of 920 poise, which flowed under its own weight. The plastisol slurry was poured into the top of feed hopper 1 and flowed under gravity into extruder 3. The extruder had an internal diameter of 3.5 inches, and was 40 inches long. The screw worm 4 was sufficiently narrow in its maximum transverse dimensions to clear the inner wall of the extruder barrel and was rotatably mounted axially on stub shaft 5 to prevent any scraping against the barrel wall. The desired degree of back pressure in the extruder was provided by axially positioned plug 9 of 3.30 inch maximum transverse diameter. The extruder was externally heated by passage of hot oil at 360° F. through the three heating jacket zones A, B, and C.

The screw was rotated at a speed of 20 r.p.m. At this rotational speed combined with the temperature maintained in the heating jacket, temperature of the inert mix within the barrel in zone A was 255° F., in zone B, 340° F., and in zone C, 350° F., the temperatures in the latter 2 zones being adequate to produce solution or gelation of the mix.

The hot, gelled extrudate passed from the extruder through the restricted passage provided by plug 9 into die 11 which was 3.930 inches in internal diameter, 68 inches long, and provided with a polished, chrome-plated interior surface. The temperature of the hot oil circulated in the die heating jacket 12 was 360° F. and the temperature of the extrudate within the die was 320° F., 12 silver, 7 mil diameter wires were introduced into the soft, gelled extrudate in the die via angled tubular wires guides 32, in the pattern shown in FIGURE 4.

From the die, the column of hot extrudate passed through the non-contact, photoelectric gaugehead 14, into cooling trough 17 where it was cooled by immersion in water to ambient temperature, through take-off unit 16, which regulated take-off speed, by saw assembly 20 which cut the column into 53 inch lengths, and finally to the collecting station.

The take-off unit was controlled by signals from the gaugehead to provide take-off speed which resulted in an extrudate column diameter, at exit from the die, of 3.960 inch and after cooling, of 3.875±0.015 inch. Production rate of the finished product averaged 27 feet and approximately 250 lbs. per hour.

When processing conditions employing the inert mix had reached a steady state, the change-over was made to a propellent plastisol mix having the same composition as the inert mix except that ammonium perchlorate in a bimodal particle size distribution consisting of 2 parts of 30 micron size and 1 part of 170 micron size, was substituted for the KCl. This plastisol had a viscosity of 1620 poise. The difference in viscosity of the "hot" mix from that of the inert mix is attributed to the different rheological properties imparted by KCl and $NH_4ClO_4$. The "hot" mix was pumped into the hopper through feed line 22, which was initially filled with the inert mix to give personnel time to make the change-over and leave the building. The propellent feed line was activated while some of the inert mix introduced from above was still in the hopper, at a rate above the screw requirements until the inert material was forced up to a desired level by propellent mix flowing in below. This provided a head of inert mix in the hopper which would be immediately available to the extruder at termination of the propellent feed run. The propellant feed rate was then adjusted by remote control to extruder requirements and extrusion continued as aforedescribed for the inert composition, with the exception that extruder heating jacket temperature in sections A, B, and C was raised to 390° F., resulting in temperatures of the material within the barrel in the corresponding zones of 280° F., 345° F., and 345° F., and the die heating jacket temperature was raised to 400° F., producing an extrudate temperature of 330° F.

The finished propellent grains were well consolidated and performed well ballistically when static fired, as indicated by the following data from one such test:

| | |
|---|---|
| Average pressure (p.s.i.a.) | 805 |
| Average thrust (lb./f.) | 240 |
| Total impulse (lb./f.-sec.) | 8638 |
| Burning time (sec.) | 38.5 |
| Nozzle diameter (in.) | 0.500 |

Production rate of the finished propellent grains was about 6 grains per hour. Grains of this size and composition normally require about 4 hours each for production by the cast molding technique.

Although this invention has been described with reference to illustrative embodiments thereof, it will be apparent to those skilled in the art that the principles of this invention can be embodied in other forms but within the scope of the claims.

We claim:

1. A process for making propellent grains which comprises introducing a fluid plastisol consisting essentially of small, spherical, substantially non-porous, solid particles of an organic polymer and a finely-divided, solid, inorganic oxidizer dispersed in a high-boiling, liquid, organic plasticizer, which dissolves said polymer readily only at elevated temperatures and in which said oxidizer is insoluble, said oxidizer being present in amount sufficient to maintain active combustion of said polymer, into an elongated cylindrical barrel, heating the plastisol to the temperature at which the polymer dissolves rapidly in the plasticizer to form a plasticized polymer matrix in which said oxidizer is uniformly dispersed, by frictionally heating said plastisol by producing shearing stresses throughout its mass while advancing it in a helical path through said barrel, and by simultaneously heating the walls of said barrel, passing the hot, gelled propellent composition in a longitudinal path through a shaping passage while keeping said composition in a soft, thermoplastic state, and then cooling said shaped composition to form a rigid gel.

2. The process of claim 1 in which, in addition, a finely-divided metal fuel is dispersed in said plasticizer.

3. The process of claim 1 in which the polymer is a polyvinyl chloride polymer.

4. The process of claim 3 in which the oxidizer is ammonium perchlorate.

5. The process of claim 2 in which the polymer is a polyvinyl chloride polymer.

6. The process of claim 5 in which the oxidizer is ammonium perchlorate.

7. The process of claim 6 in which the finely divided metal is aluminum.

8. A process for making propellent grains which comprises introducing a fluid plastisol consisting essentially of small, substantially spherical, substantially non-porous particles of an organic polymer and a finely-divided, solid, inorganic oxidizer dispersed in a high-boiling, liquid organic plasticizer, which dissolves said polymer readily only at elevated temperatures and in which said oxidizer is insoluble, said oxidizer being present in amount sufficient to maintain active combustion of said polymer, into an elongated cylindrical barrel, heating the plastisol to the temperature at which the polymer dissolves rapidly in the plasticizer to form a plasticized polymer matrix in which said oxidizer is uniformly dispersed, by frictionally heating said plastisol by producing shearing stresses throughout its mass while advancing it in a helical path through said barrel, and by simultaneously heating the walls of said barrel, shaping the hot, gelled propellent composition into a column by passing it in a longitudinal path through a shaping passage while keeping said composition in a soft, thermoplastic state, controlling the diameter of said column by regulating the rate of take-off of said column leaving said shaping passage, and cooling said shaped composition to form a rigid gel.

9. The process of claim 8 in which the polymer is a polyvinyl chloride polymer.

10. The process of claim 9 in which the oxidizer is ammonium perchlorate.

11. The process of claim 8 in which, in addition, a finely-divided metal fuel is dispersed in said plasticizer.

12. A process for making propellent grains which comprises introducing a fluid plastisol consisting essentially of small, substantially spherical substantially non-porous particles of an organic polymer and a finely-divided, solid, inorganic oxidizer dispersed in a high-boiling, liquid organic plasticizer, which dissolves said polymer readily only at elevated temperatures and in which said oxidizer is insoluble, said oxidizer being present in amount sufficient to maintain active combustion of said polymer, into an elongated cylindrical barrel, heating the plastisol to the temperature at which the polymer dissolves rapidly in the plasticizer to form a plasticized polymer matrix in which said oxidizer is uniformly dispersed, by frictionally heating said plastisol by producing shearing stresses throughout its mass while advancing it in a helical path through said barrel, and by simultaneously heating the walls of said barrel, shaping the hot, gelled propellent composition into a column by passing it in a longitudinal path through a shaping passage while keeping said composition in a soft, thermoplastic state, introducing a plurality of spaced heat-conductive metal wires into said column of soft, gelled propellent in a direction parallel to the path of flow of the propellant during its travel through said shaping passage, and then cooling said shaped composition to form a rigid gel.

13. The process of claim 12 in which the polymer is a polyvinyl chloride polymer.

14. The process of claim 13 in which the oxidizer is ammonium perchlorate.

15. The process of claim 12 in which, in addition, a finely-divided metal fuel is dispersed in said plasticizer.

16. A process for making propellent grains which comprises introducing a fluid plastisol consisting essentially of small, substantially spherical substantially non-porous particles of an organic polymer and a finely-divided, solid inorganic oxidizer dispersed in a high-boiling, liquid organic plasticizer, which dissolves said polymer readily only at elevated temperatures and in which said oxidizer is insoluble, said oxidizer being present in amount sufficient to maintain active combustion of said polymer, into an elongated cylindrical barrel, heating the plastisol to the temperature at which the polymer dissolves rapidly in the plasticizer to form a plasticized polymer matrix in which said oxidizer is uniformly dispersed, by frictionally heating said plastisol by producing shearing stresses throughout its mass while advancing it in a helical path through said barrel, and by simultaneously heating the walls of said barrel, shaping the hot, gelled propellent composition into a column by passing it in a longitudinal path through a shaping passage while keeping said composition in a soft, thermoplastic state, introducing a plurality of spaced heat-conductive metal wires into said column of soft, gelled propellent in a direction parallel to the path of flow of the propellant during its travel through said shaping passage, controlling the diameter of said column by regulating the rate of take-off of said column leaving said shaping passage, and cooling said shaped composition to form a rigid gel.

17. The process of claim 16 in which the polymer is a polyvinyl chloride polymer.

18. The process of claim 17 in which the oxidizer is ammonium perchlorate.

19. The process of claim 16 in which, in addition, a finely-divided metal fuel is dispersed in said plasticizer.

20. The process of claim 1 in which an inert fluid plastisol consisting essentially of small, spherical, substantially non-porous, solid particles of an organic polymer and a finely-divided, inert, solid salt dispersed in a high-boiling, liquid, organic plasticizer, which dissolves said polymer readily only at elevated temperatures and in which said salt is insoluble, is first introduced into said elongated cylindrical barrel, followed by introduction of the fluid plastisol containing the inorganic oxidizer, without interruption in processing.

21. The process of claim 20 in which the polymer in both the inert and oxidizer-containing plastisols in a polyvinyl chloride polymer.

22. A process for making propellent grains which comprises introducing a fluid plastisol consisting essentially of small, spherical, substantially non-porous, solid particles of an organic polymer and a finely-divided, solid, inorganic oxidizer dispersed in a high boiling, liquid, organic plasticizer, which dissolves said plasticizer readily only at elevated temperature and in which said oxidizer is insoluble, said oxidizer being present in amount sufficient to maintain active combustion from said polymer, into an elongated cylindrical barrel, heating the plastisol to a temperature at which the polymer dissolves rapidly in the plasticizer to form a plasticized polymer matrix in which said oxidizer is uniformly dispersed, by frictionally heating said plastisol by producing shearing stresses throughout its mass while advancing it in a helical path through said parallel, passing the hot, gelled propellent composition in a longitudinal path through a shaping passage while keeping said composition in a soft, thermoplastic state, and then cooling said shaped composition to form a rigid gel.

23. The process of claim 22 in which the polymer is a polyvinyl chloride polymer.

24. The process of claim 22 in which a plurality of spaced metal wires are introduced into said column of soft, gelled propellent in a direction parallel to the path of flow of the propellent during its travel through said shaping passage.

25. The process of claim 24 in which the polymer is a polyvinyl chloride polymer.

References Cited in the file of this patent

UNITED STATES PATENTS

| | | |
|---|---|---|
| 2,263,569 | Caldwell et al. | Nov. 28, 1944 |
| 2,857,258 | Thomas | Oct. 21, 1958 |
| 2,929,697 | Perry et al. | Mar. 22, 1960 |
| 2,946,672 | Marti | July 26, 1960 |

FOREIGN PATENTS

| | | |
|---|---|---|
| 652,542 | Great Britain | Apr. 25, 1951 |

OTHER REFERENCES

Zaehringer: "Missiles and Rockets," vol. 4, No. 6, Aug. 11, 1955, pages 32 and 34.

Zaehringer: "Missiles and Rockets," vol. 5, No. 7, Feb. 16, 1959, page 33.

"Chemical and Engineering News," July 27, 1959, pages 22 and 23.